(12) United States Patent
Spatafora

(10) Patent No.: US 6,544,157 B1
(45) Date of Patent: Apr. 8, 2003

(54) DEVICE FOR DRIVING ROLLERS IN AUTOMATIC MACHINES

(75) Inventor: Mario Spatafora, Bologna (IT)

(73) Assignee: G. D S.p.A., Bologna (IT)

(*) Notice: Subject to any disclaimer, the term of this patent is extended or adjusted under 35 U.S.C. 154(b) by 3 days.

(21) Appl. No.: 09/595,929

(22) Filed: Jun. 16, 2000

(30) Foreign Application Priority Data

Jun. 29, 1999 (IT) .......................................... BO99A0346

(51) Int. Cl.[7] .............................................. F16C 13/00
(52) U.S. Cl. .............................. 492/15; 492/8; 492/16
(58) Field of Search .................................. 131/280, 282; 492/15, 7, 8, 9, 10, 16, 30, 31, 46; 310/166, 168, 261, 254; 414/433; 73/514.39; 324/176, 160; 198/478.1

(56) References Cited

U.S. PATENT DOCUMENTS

| 3,701,873 | A | * | 10/1972 | Bauer et al. |
| 4,208,601 | A | * | 6/1980 | Tardieu |
| 4,214,483 | A | * | 7/1980 | Young |
| 4,651,040 | A | * | 3/1987 | Gerstner et al. |
| 5,214,378 | A | * | 5/1993 | Hore |
| 5,263,920 | A | * | 11/1993 | Budza et al. |
| 5,448,117 | A | * | 9/1995 | Elliott |
| 5,553,729 | A | * | 9/1996 | Kitano et al. |
| 5,665,043 | A | * | 9/1997 | Hasselberg et al. |
| 5,697,488 | A | | 12/1997 | Kaluza |
| 5,763,859 | A | * | 6/1998 | Wirz et al. |
| 5,990,590 | A | * | 11/1999 | Roesel, Jr. et al. |
| 6,191,510 | B1 | * | 2/2001 | Landin et al. |

FOREIGN PATENT DOCUMENTS

| DE | 44 26 106 | 1/1996 |
| DE | 196 14 936 | 10/1997 |
| EP | 0 577 061 | 1/1994 |
| EP | 0 627 175 | 12/1994 |

* cited by examiner

Primary Examiner—Gregory M. Vidovich
Assistant Examiner—T. Nguyen
(74) Attorney, Agent, or Firm—The Law Office of Timothy J. Klima

(57) ABSTRACT

Cigarette sticks are carried through a filter tip attachment on a train of rollers, each comprising a fixed first tubular body rigidly associated with a vertical bulkhead and a rotatable second-tubular body placed coaxially over the fixed tubular body and centered on an axis common to both bodies. Each roller incorporates a stator rigidly associated with the first tubular body and a rotor rigidly associated with the second tubular body, coinciding respectively with the primary and the secondary of an electric motor of which the winding is connected to a power source governed by a master controller; the controller receives signals from individual transducers capable at any given moment of sensing the angular position and velocity of the single rollers, in such a way as to select a predetermined timing for each roller relative to the others of the train, which is maintained throughout each operating cycle.

10 Claims, 4 Drawing Sheets

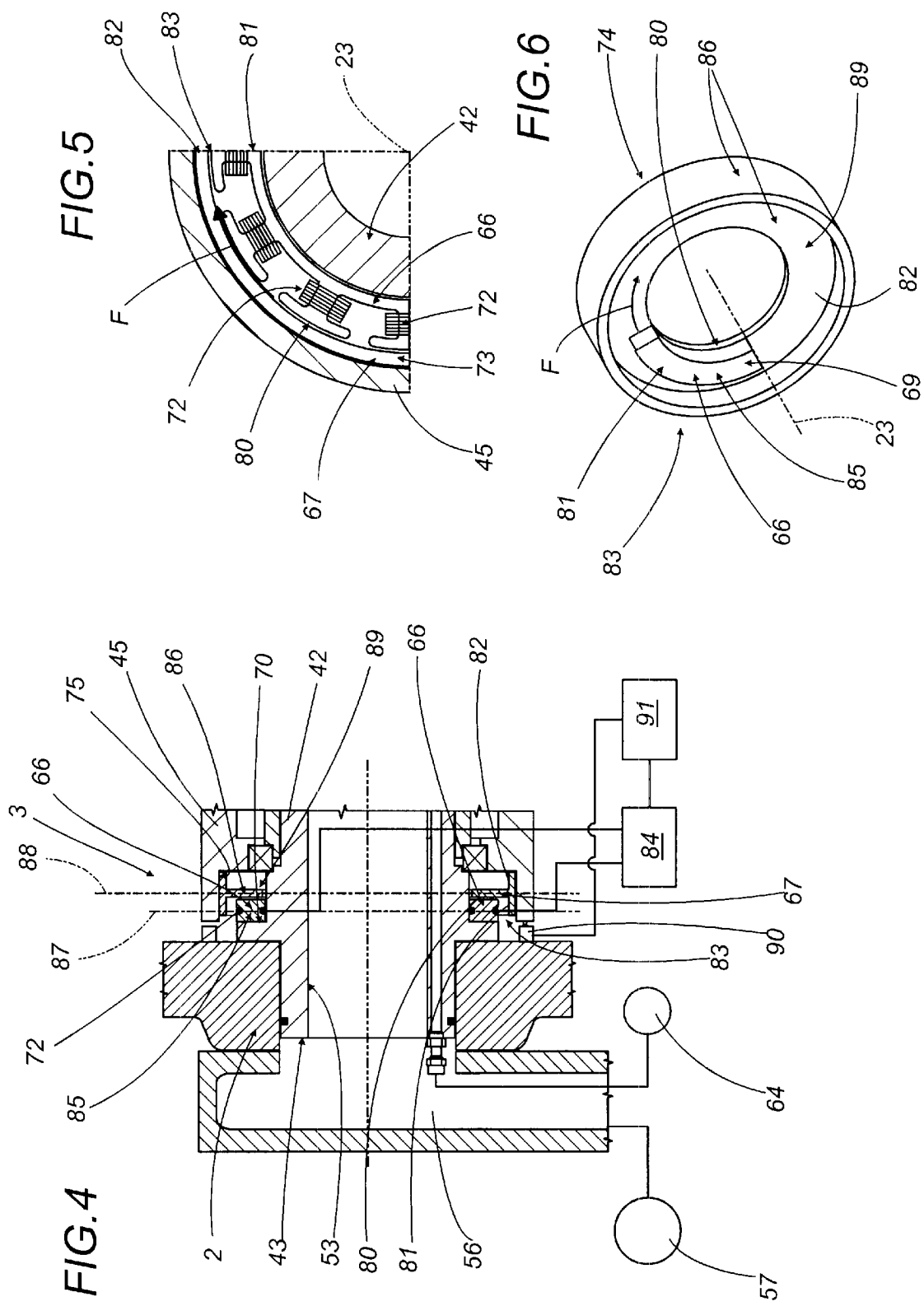

DEVICE FOR DRIVING ROLLERS IN AUTOMATIC MACHINES

BACKGROUND OF THE INVENTION

The present invention relates to a device for driving rollers in automatic machines.

In particular, the invention relates to a device for driving the rollers of an automatic machine employed in the manufacture of filter cigarettes, referred to generally as a filter tip attachment, to which reference is made explicitly throughout the following specification albeit implying no limitation in scope. In effect, the invention would find application to equal advantage, for example, in a drive system used to producing the continuous rotation of wrapping turrets in packer machines.

Conventionally, when manufacturing filter tipped cigarettes in a machine of the type in question, each one of a first succession of sticks, cut from a cigarette rod and spaced apart a predetermined distance one from the next, is joined at a rolling station by way of a connecting element of sheet material to one of a second succession of sticks cut likewise from a cigarette rod, thus fashioning an intermediate tobacco product describable as a "double cigarette". Each such double cigarette appears as two sticks of cigarette rod separated one from the other by a double filter plug; the plug is united to the two sticks by the connecting element, which consists in a band of paper material cut transversely from a continuous strip decoiled from a roll, a central part of the band enveloping the double filter plug and the two endmost parts wrapped each around one end of a respective stick. The double cigarettes assembled in this way are directed in succession through a cutting station where each double cigarette is severed transversely into two halves, thereby generating two columns of oppositely oriented single cigarettes disposed with the respective filters adjacent and substantially in contact one with another. The two columns of cigarettes advance thereupon into an overturning station where the cigarettes of one column are flipped onto the cigarettes of the other column to obtain a single column of cigarettes, identically oriented, which are advanced through an outfeed of the filter tip attachment and toward the infeed of a packer.

In general, conventional filter tip attachments of the type mentioned above include a train of feed rollers rotatable about mutually parallel axes and constituting the aforementioned rolling stations. Each such roller affords a plurality of suction flutes distributed uniformly about the periphery, each of which designed to take up and advance one relative tobacco product in a direction transverse to its longitudinal axis.

Each roller of the type outlined above comprises a shaft set in rotation by a gear coupled to one end, also a first internal tubular body disposed coaxial with the shaft and connected rigidly by one end to a bulkhead of the machine frame. The roller also comprises at least one second external tubular body associated with the first tubular body by way of respective rolling bearings; the second tubular body is disposed thus coaxially with the internal body, and connected rigidly to the aforementioned shaft by which it is driven in rotation about an axis common to both tubular bodies.

The single roller is equipped also with a vacuum duct to which the suction flutes distributed about the periphery of the external second tubular body can be connected by way of a longitudinal cavity formed internally of the first tubular body and a plurality of relative holes afforded by the second tubular body, thereby enabling each flute to retain a respective tobacco product through the force of suction for a given duration, even in the presence of actions that tend during operation of the filter tip attachment to dislodge the stick from the flute currently occupied, whether due to gravity, or to the considerable centrifugal force generated by the high angular velocity of the single rollers.

In a typical arrangement the rollers are mounted overhung, each supported by a respective shaft of which the bearing block is positioned in a housing afforded by a vertical bulkhead of the machine.

The torque required to set the roller in rotation is transmitted to the shaft generally by a gear, associated rigidly with one end of the shaft on the side of the bulkhead remote from the roller.

In addition to the product feed rollers described above, a filter tip attachment comprises other types of rollers driven in rotation, for example a set of rollers serving to feed and apply the band of tipping paper by which the filter is wrapped and joined to the stick of cigarette rod. These rollers likewise are carried by respective shafts and set in rotation by corresponding gears associated with the ends of the shafts on the side of the vertical bulkhead opposite from the rollers.

It will be evident from the foregoing description that, in addition to supporting the rollers, the vertical bulkhead described above also functions as a partition, separating the rollers on the one side from the respective gears, which are enclosed in one or more-housings on-the other side and arranged substantially in a continuous train timed in such a way as to guarantee the necessary synchronization of the various rollers.

Given that the high output capacity of filter tip attachments-used in modern machines is associated with the higher and higher rotational speeds of the components used in their construction, lubrication is an aspect of great importance and a key factor in determining correct operation of the machine overall. Accordingly, such machines incorporate a complex network of pipelines, installed normally at the rear, carrying fluid by which the gears are lubricated individually. The gears require forced lubrication moreover, and accordingly the machine must be equipped internally with hydraulic pumps connected to the network of pipelines, also with respective vessels in which the lubricant is held and recirculated.

One of the main drawbacks-connected with this type of lubrication derives from the fact that in order to lubricate the numerous moving parts, a complex system of seals is needed for each roller; these seals must also be inspected periodically and renewed when necessary in order to maintain their efficiency, inasmuch as any-wear or accidental damage resulting in-an impairment of integrity could cause the lubricant to leak onto the rollers and penetrate the flutes accommodating the sticks. The tobacco product would inevitably then be soiled by the lubricant and a relatively large quantity would have to be rejected for each operating cycle of the machine completed.

To the end of overcoming this drawback, designers of filter tip attachments, and indeed of machines in many other art fields, have sought to replace the train of gears driving the rollers by coupling each roller to a respective electric motor, thereby eliminating the gear. Whilst the problems connected with lubrication are overcome by this expedient, another problem is introduced, namely the bulk of the electric motors, since the shaft of each motor must be coupled to the shaft of[ ]the roller and the motor itself mounted by cantilevering the frame from the vertical bulkhead.

Other drawbacks are linked to the utilization of individual electric motors coupled to the shafts of the single rollers: the considerable difficulties experienced in controlling the motors in such a manner as to ensure faultless synchronization of the rollers making up the train so that the tobacco products proceed smoothly from one station to the next and the various manufacturing operations are performed correctly on each one; also the high cost of the motors themselves, which are required in number equal to the number of rollers installed in the machine (not inconsiderable) and.thus tend to impact decisively on the overall cost of the machine.

The object of the invention is to provide a drive system for the rollers of automatic machines that is of comparatively compact dimensions, free from the lubrication-related problems mentioned above, simple in embodiment and economical.

SUMMARY OF THE INVENTION

The stated object is duly realized in a device according to the present invention for driving the rollers of automatic machines, wherein each roller comprises at least one first tubular body rigidly associated with the machine, also a second tubular body placed coaxially over the first tubular body and rotatable relative to the selfsame first tubular body about a common axis of rotation.

Advantageously, the device disclosed comprises electric drive means incorporated into each single roller, consisting in at least one inductor member associated rigidly with one first or second tubular body, and at least one inducible member associated rigidly with the remaining first or second tubular body.

BRIEF DESCRIPTION OF THE DRAWINGS

The invention will now be described in detail, by way of example, with the aid of the accompanying drawings, in which:

FIG. 4 shows an alternative embodiment of a typical roller forming part of a set as illustrated in FIG. 1, viewed schematically, enlarged and in section and with certain parts omitted;

FIG. 5 is an enlarged detail of FIGS. 2 and 3;

FIG. 6 is an enlarged detail of FIG. 4.

DESCRIPTION OF THE PREFERRED EMBODIMENTS

Figure 1:
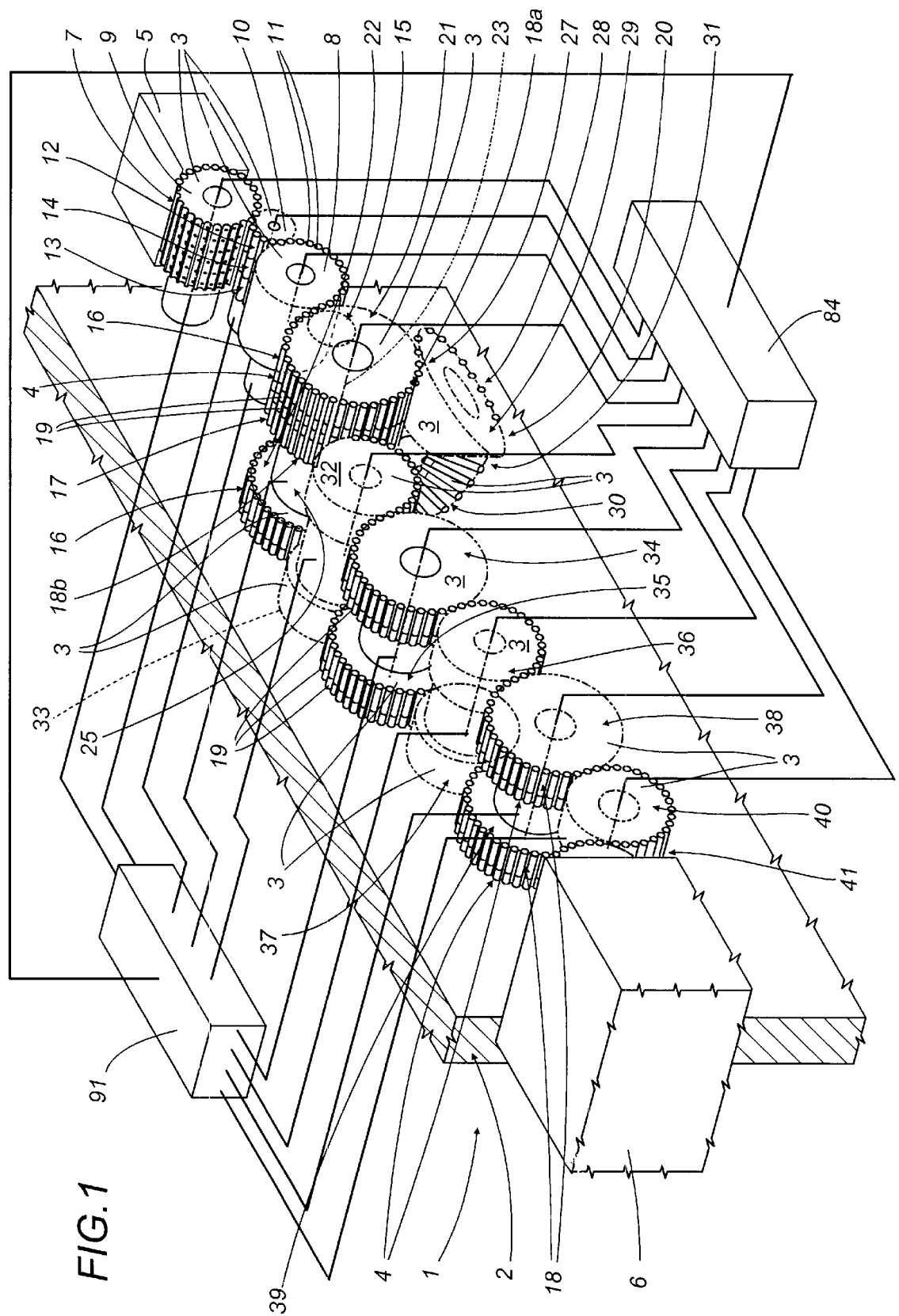
FIG. 1 illustrates a portion of a filter tip attachment in a preferred embodiment, schematically and in perspective and with certain parts omitted, comprising a set of rollers each equipped with a respective drive device embodied according to the present invention.

Referring to FIG. 1 of the drawings, 1 denotes a portion, in its entirety, of a machine for the manufacture of tobacco products, namely cigarettes and the like, and more exactly a portion of a filter tip attachment carried by a fixed vertical bulkhead 2 forming part of a frame (not illustrated in the drawings) and comprising a plurality of rollers each generically denoted 3, operating in conjunction one with another, disposed parallel and substantially tangential one to the next, by which one or more columns of tobacco product sticks 4 are transferred from the outfeed of a cigarette maker, conventional in embodiment and indicated by the block denoted 5, to the infeed of a packer unit, likewise conventional in embodiment and indicated by the block denoted 6, by which the sticks 4 are wrapped in packets.

Concerning the aforementioned tobacco products, the term "stick" is used throughout the following specification to denote any of the various discrete semi-finished and finished articles passing through the portion 1 of the filter tip attachment, without distinction and according to the positions occupied along the conveying path: the stick can be a length of cigarette rod, a double filter plug, a double cigarette or a finished single cigarette. Each of the various types of discrete tobacco product stick will be denoted in the course of the specification by a respective reference number.

Similarly, each of the rollers 3 will be denoted by a corresponding reference number.

The portion 1 of the filter tip attachment shown in FIG. 1 comprises an infeed station 7 equipped with a first roller 8 exhibiting a plurality of suction flutes 26 (FIG. 2), and two transfer rollers 9 and 10 from which the first roller 8 receives a column of double cigarettes 11 each comprising two sticks of cigarette rod 12 and 13 interconnected by a double length filter plug 14.

Rotating clockwise as viewed in FIG. 1, the first roller 8 takes up the double cigarettes 11 and advances them through a cutting station 15 of conventional embodiment where they are cut in half to form two columns 16 and 17 of cigarettes 18 denoted 18a and 18b, disposed side by side and oppositely oriented, that is, with the respective filter tips 19 lying adjacent and substantially in contact one with another.

Figure 3:
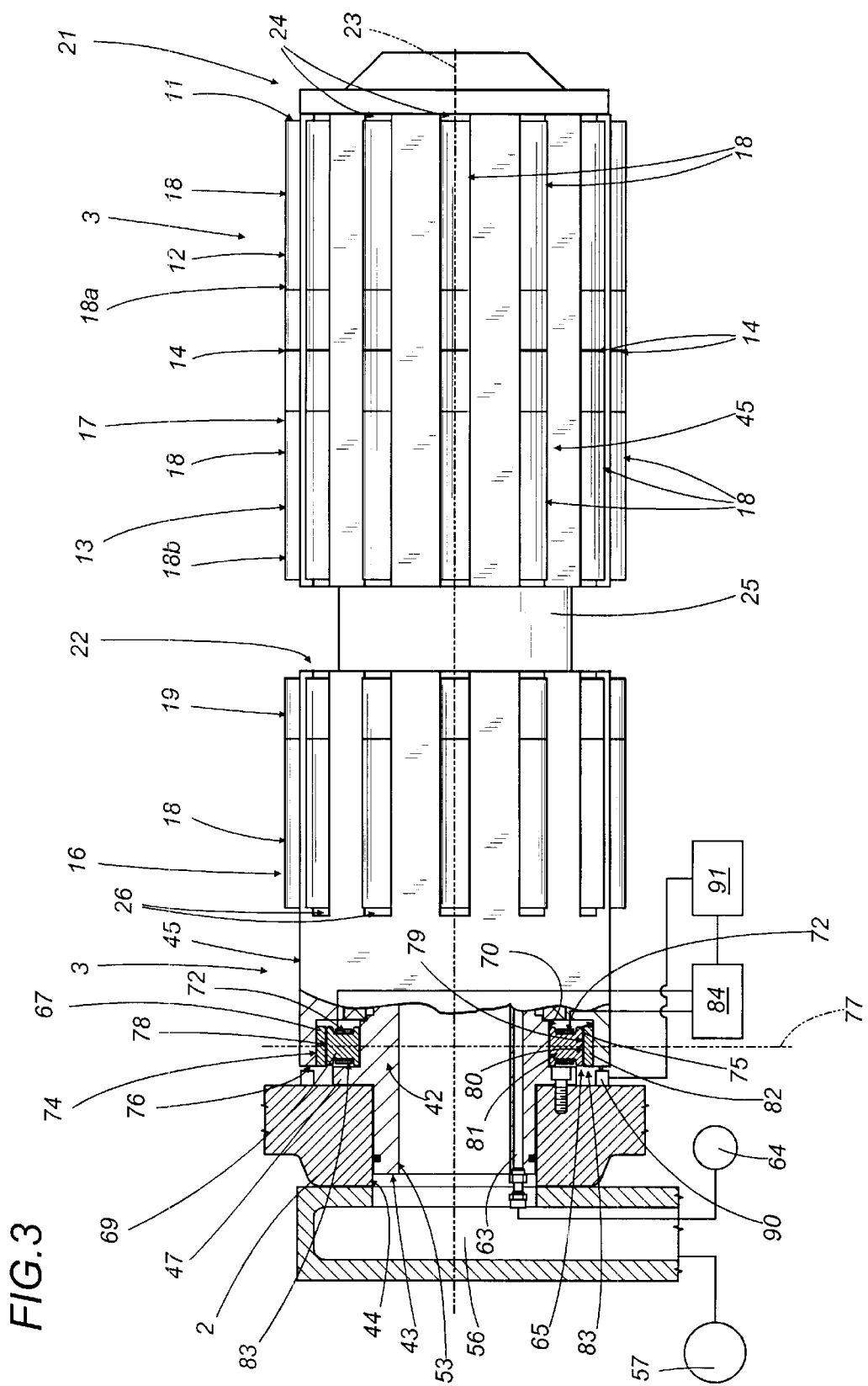

The columns 16 and 17 are released by the first roller 8 to an overturning unit 20 comprising two rollers 21 and 22 disposed side by side, of which one roller 21 is disposed tangentially to the first roller 8 and presents an axial length substantially twice that of the remaining roller 22. Referring to FIGS. 1 and 3, the aforementioned roller 21 is rotatable counterclockwise as viewed in FIG. 1 about a relative axis 23 and embodied with a plurality of suction flutes 24 (FIG. 3) distributed uniformly about its periphery, each designed to accommodate and retain two relative cigarettes 18a and 18b disposed mutually adjacent and in contact, oppositely oriented.

The roller denoted 22 is coaxially aligned with the roller 21 of double length, to which it is coupled rigidly on the side carrying the column denoted 17 by way of a connecting shaft 25 of predetermined length, and embodied likewise with a plurality of peripheral suction flutes 26 (FIG. 3) each extending in coaxial alignment with a corresponding flute 24 of the roller 21.

Advancing on the roller 21, the cigarettes 18a of the column 16 farther from the bulkhead 2 approach a station 27 at which they are taken up singly and in succession by an overturning assembly 28 with conical rollers forming part of the aforementioned unit 20, flipped through 180° and transferred to the flutes 26 of the roller 22 alongside. In this way, each cigarette 18a of the column 16 occupying a relative flute 24 of the one roller 21 is rotated to the opposite side of the adjoining column 17 and deposited in a position of alignment and identical orientation with a corresponding cigarette 18b of the latter column 17.

The overturning assembly 28 in the particular example of FIG. 1 is of a design described and illustrated in EP 0 627 175, comprising two conical rollers 29 and 30 disposed with their axes at right angles and occupying the same plane as the axis 23 of the roller 21 above. A first conical roller 29 rotates tangentially to the latter roller 21 at the. take-up station 27 so that the cigarettes 18a can be directed onto its periphery, whilst the second conical roller 30 rotates tangentially to the first conical roller 29 at a transfer station 31 where the cigarettes 18a pass from the one roller 29 to the other roller 30. The second conical roller 30 also rotates tangentially to the roller 22 above at a release station (not illustrated in FIG. 1) where the cigarettes 18a are transferred to this same roller 22.

The remaining rollers 32, 33, 34, 35,36, 37, 38, 39 and 40 illustrated in FIG. 1 serve to advance 20 the two columns 16 and 17 of cigarettes 18 toward an outfeed station 41 afforded by the portion 1 of the filter tip attachment, from which the columns 16 and 17 are then directed into the packer unit 6.

Figure 2:
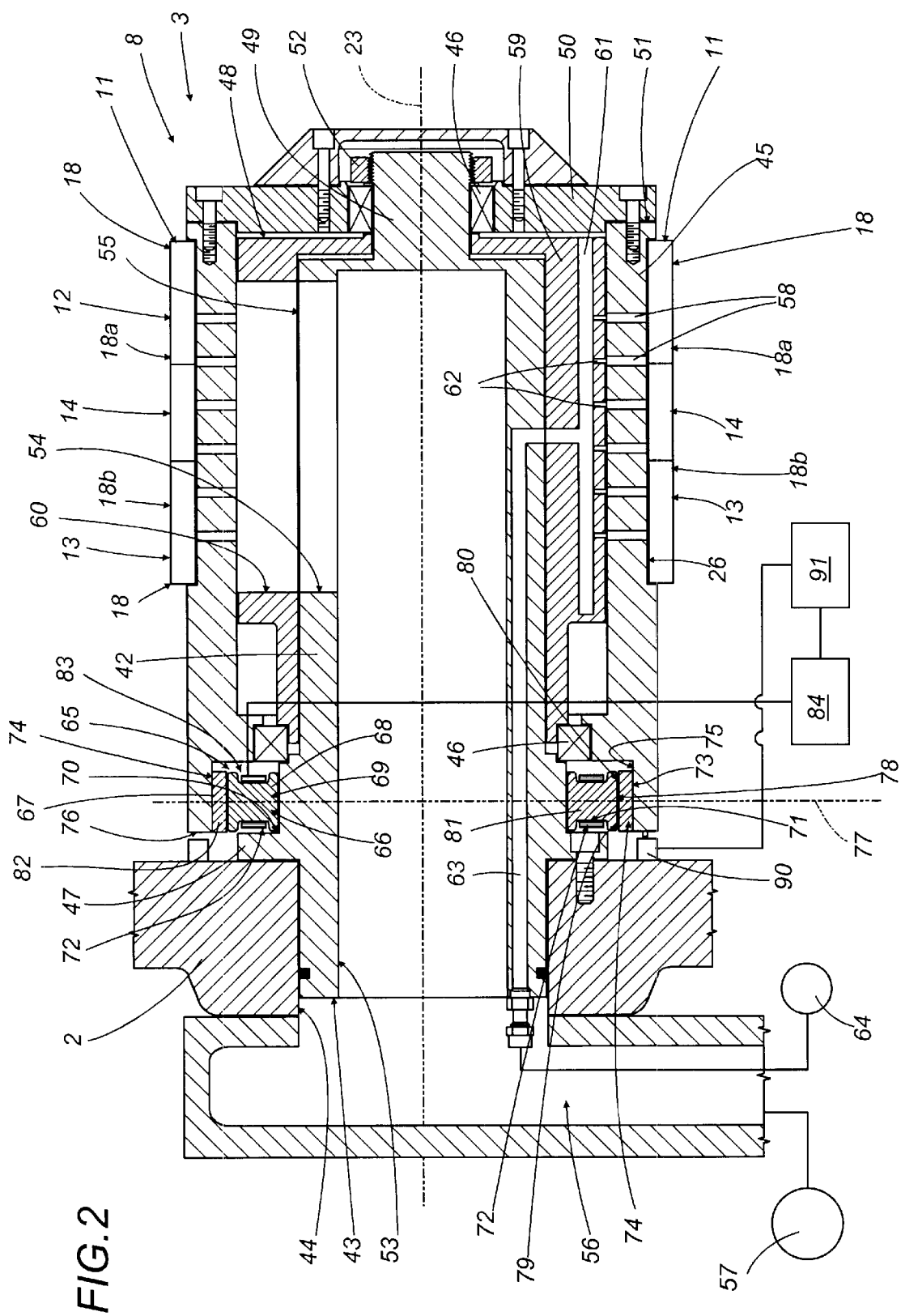
FIGS. 2 and 3 are schematic longitudinal and side elevations, respectively, both enlarged and with certain parts omitted, showing a preferred embodiment of two typical rollers forming part of a set as illustrated in FIG. 1.

As discernible from FIGS. 2 and 3, which relate in particular and purely by way of example to the first roller 8 and to the pair of rollers 21 and 22 next in sequence, respectively, each roller 3 in FIG. 1 comprises a first fixed tubular body 42, of which an open first end 43 is insertable to a fluid tight fit in a respective hole afforded by the bulkhead 2 of the portion 1 of the filter tip attachment, and a second tubular body 45 is coupled externally and coaxially to the first body 42 by way of two interposed rolling bearings 46 (of which one only is visible in FIG. 3) in such a way that the second body 45 is freely rotatable relative to the first body 42 about an axis 23 common to both. It will be observed, in connection with the axis of rotation, that all the rollers 3 have a respective axis of rotation, and that the axis is denoted 23 for all the rollers indicated. Also, in the case of the rollers 21 and 22 illustrated in FIG. 3, the second tubular body of both rollers is denoted 45. Referring to FIG. 2 in particular, the first tubular body 42 presents an outer annular collar 47 at the open first end 43, functioning as a flange by means of which the body 42 is abutted against and secured to the bulkhead 2, and an enclosed second end 48 affording a pivot 49 to which one of the two rolling bearings 46 is keyed. A flange 50 supported radially by the bearing 46 is positioned with the circumference anchored rigidly to one end of the second tubular body 45, and more exactly the end 51 farthest from the bulkhead 2. The flange 50 and the associated bearing 46 are retained axially on the pivot 49 by means of a locknut 52 engaging a thread afforded by the extremity of the selfsame pivot 49.

The first tubular body 42 also has an internal cavity 53 extending longitudinally from the open first end 43 and, nearer to the enclosed end 48, a lateral opening 54 communicating with the cavity 53 and serving to connect a lateral sector 55 of the first body 42 with a first duct 56 located on the opposite side of the bulkhead 2 from the collar 47 conveying negatively pressurized gas and connected to a source of negative pressure denoted 57.

Observing the roller 8 illustrated in FIG. 2, and indeed the roller 21 illustrated in FIG. 3, it will be seen that the periphery of the second tubular body 45 affords a plurality of flutes 26 serving to accommodate the double cigarettes 11. Each flute 26 of the rollers denoted 8 and 22 and each flute 24 of the roller denoted 21 is provided with relative through holes 58 fashioned radially in the second tubular body 45, so that when the second tubular body 45 rotates about the common axis 23 relative to the first tubular body 42, the flutes 24 and 26 will be connected cyclically by way of the sector 55 to the duct 56 conveying the negatively pressurized gas. Observing FIG. 2 in particular, each roller 3 further comprises an intermediate fixed third tubular body 59 associated rigidly and concentrically with the first tubular body 42, interposed between the stationary first body 42 and the rotatable second body 45.

The third tubular body 59 incorporates a lateral opening 60 aligned concentrically and coinciding with the opening 54 formed in the first body 42, also a manifold 61 distanced angularly from the opening 60 and affording a plurality of respective holes 62 opening onto the periphery of the selfsame tubular body 59. The manifold 61 is connected to a second duct 63 extending longitudinally through the first tubular body 42 and connected to a source of pressurized gas denoted 64.

In operation, when the second tubular body 45 of each roller 3 is set in rotation about the first tubular body 42, the holes 58 of each flute 26 or 24 respectively accommodating a double cigarette 11 or a single cigarette 18 are connected cyclically with the source 57 of negative pressure by way of the openings 60 and 54, the cavity 53 and the first duct 56, thereby causing the double cigarettes 11 or the single cigarettes 18 to be retained in the respective flutes 26 or 24 as they advance on the roller 3 in question. As each successive flute 24 or 26 draws into alignment with the manifold 61 during the rotation of the second tubular body 45, the relative holes 58 coincide with the holes 62 of the manifold 61 and the flute 24 or 26 is connected by way of the second duct 63 with the source 64 of pressurized gas, causing a stream of fluid to be forced through the holes 58 and thus favoring the separation of the double cigarettes 11 or single cigarettes 18 from the second tubular body 45 of the roller 3 at a station where the cigarettes are released to the next-roller in sequence.

Referring to FIGS. 2 . . . 6, and according to the present invention, each single roller 3 comprises respective electric drive means denoted 65 in their entirety, by which the second tubular body 45 is set in rotation about the common axis 23 relative to the fixed first tubular body 42.

In the example of FIGS. 2 and 3, the electric drive means 65 comprise at least one inductor member 66 and one inducible member 67.

The inductor member 66 is provided by a magnetic core 68 appearing as an annular stator 69, rigidly associated with the first tubular body 42, which occupies a respective first annular seating 70 fashioned coaxially on the first tubular body 42, adjacent to the annular collar 47. As shown partly in the detail of FIG. 5, the magnetic core 68 is fashioned with a plurality of slots 71 arranged around the periphery and serving to accommodate the coil windings that constitute the electrical part of the stator 69. The inducible member 67 appears as an annular support 73 embodied in a homogeneous metallic material such as copper or aluminum or other conductive metal alloy, creating a rotor 74 that is associated rigidly with the moving second tubular body 45. The rotor 74 is coaxial with the stator 69 and occupies a respective second annular seating 75 formed concentrically on the second tubular body 45, or more exactly, afforded by the end 76 of the body remote from the enclosed end 51 and directed toward the bulkhead 2. In particular, the stator 69 and the rotor 74 are aligned on a common median plane 77, transverse to the axis 23 of rotation, disposed respectively with the outer peripheral face 78 and the inner peripheral face 79 breasted together and separated by an air gap 80 across which electromagnetic induction occurs.

In the example of FIGS. 2, 3 and 5, the stator 69 and the rotor 74 coincide with the primary winding 81 and the secondary winding 82 of a linear electric motor 83 in which the windings 72 are excited by a power source 84 wired, as illustrated in FIG. 1, in such a way as to supply current to each winding 72 of each roller 3.

In operation, when a given current is supplied to the stator windings 72 by the power source 84, a moving magnetic field is set up in the gap 80 which in the particular case in point moves along the gap circumferentially.

At the same time, an induced current is generated in the annular support 73 of the rotor 74, creating a force F that moves perpendicularly to the current in a direction, according to Lenz's law, that will depend on the direction in which the current itself circulates (clockwise in FIG. 5); as a result the rotor 74 is set in rotation and the second tubular body 45, being rigidly associated with the rotor, is caused to rotate about the common axis 23 in relation to the first tubular body 42. Accordingly, the direction of the force F is determined by the direction in which the current flows through the stator windings 72.

At this juncture it should be emphasized that the annular support 73 constituting the rotor 74 is a closed circular element fashioned, as mentioned previously, from a conductive homogeneous metallic material. Accordingly, the stator 69 and rotor.74 could be parts of an asynchronous or a synchronous electric motor in which the rotor 74, hence the annular support 73, would be an inducible member 67 in short circuit. The stator 69 in this particular embodiment, connected appropriately to the power source, would produce a rotating magnetic field able to induce electromotive forces in the annular support 73 according to the laws of electromagnetic induction. These induced electromagnetic forces would then set up currents in the short-circuited inducible member 67 that circulate in the annular support 73 along paths extending both following the circular side walls in one direction, around the axis 23 of rotation, and transversely through the width of the support in a direction parallel to the selfsame axis 23. The currents would thus interact with the rotating field and generate forces tending to set the inducible member 67 in rotation about the axis 23.

In the alternative embodiment of FIGS. 4 and 6, the inductor member 66 consists in at least one pole shoe 85 likewise in this instance constituting the magnetic core 68 of a stator 69 positioned at a given point within the first annular seating 70, and the inducible member 67 is embodied as a flat ring 86 disposed concentrically with the first and second tubular bodies 42 and 45, rigidly associated with the second body 45 and occupying the second annular seating 75.

In this solution, the pole shoe 85 is aligned on a relative first plane 87 transverse to the axis 23 of rotation, whilst the flat ring 86 is aligned on a second plane 88 parallel to the first plane 87, transverse likewise to the axis 23 of rotation. The pole shoe 85 is equipped with a relative electrical winding 72 and offered to one side face 89 of the flat ring 86, which in like manner to the example of FIGS. 2 and 3 appears as an annular support 73 fashioned from a homogeneous metallic material such as copper or aluminum or other conductive metal alloy and creating a rotor 74 associated rigidly with the moving second tubular body 45.

It will be evident that the drive means indicated in the example of FIGS. 4 and 6 could comprise a plurality of pole shoes 85 equispaced angularly around the first annular seating 70 incorporated coaxially into the first tubular body 42 of each roller 3.

As in the embodiment of FIGS. 2 and 3, a gap 80 is created between the stator 69 and the rotor 74, which coincide respectively with the primary winding 81 and the secondary winding 82 of a linear electric motor 83, and the windings 72 of the pole shoes 85 are excited by a power source 84 wired, as shown in FIG. 1, in such a way as to supply current to each winding 72 of each roller 3.

Importantly, whichever of the solutions described above may be adopted, the angular velocity of the rotor 74, and consequently of the second tubular body 45 relative to the first body 42, is dependent on the electromagnetic induction produced between the stator 69 and the rotor 74 and generating the aforementioned moving magnetic field, of which the induced electromagnetic force F is dependent in turn on the dynamic electrical parameters of the power input. In short, the rotational speed of the rotor is determined by the value of the current and therefore the value of the voltage supplied to the relative windings 72 from the power source 84, and by the frequency of the supply.

With this in mind, each roller 3 is equipped with a respective fixed measuring transducer 90 anchored rigidly to the bulkhead 2 and positioned to sense the rotational movement of the second tubular body 45. The function of the transducer 90 at any given moment in operation is to determine the dynamic parameters reflecting the angular displacement of the second tubular body 45 about the axis 23 of rotation and its position relative to the fixed first tubular body 42, and thereupon to generate a proportional output signal which is relayed to a master control unit 91. In other words, during one revolution of the second tubular body 45 about the fixed first body 42, the transducer 90 establishes a given relation between the angular position and the angular velocity of the second tubular body 45 on the one hand, and its own output signal on the other. In particular, the control unit 91 and the power source 84 are connected in such a way as to provide a feedback loop between the transducers 90 and the source 84.

With the portion 1 of the filter tip attachment configured as shown in FIG. 1, the transducers 90 (not illustrated in FIG. 1) associated with the various rollers 3 will generate the aforementioned proportional output signals in the course of each operating cycle, to indicate the momentary angular position of each rotating second tubular body 45 and the relative speed of rotation, so that the angular positions and angular velocities of the single rollers 3 can be monitored continuously and in real time. Accordingly, each of the rollers 3 will be timed in relation to the other rollers 3, and this timing will be maintained throughout the operating cycle.

Thus, in operation, during each cycle completed by the portion 1 of the filter tip attachment, each transducer 90 is programmed to monitor the angular velocity of the rotating second tubular body 45 of a respective roller 3, which is diameter-related and therefore different from one roller 3 to the next, as also the resulting peripheral velocities are different one from the next. In this way, the peripheral velocity of each tubular body 45 can be controlled continuously and in such a manner as to obtain faultless timing between all the rollers 3 in the portion 1 of the filter tip attachment to which the invention relates.

What is claimed is:

1. A device for driving rollers in automatic machines, comprising at least one roller having at least one first tubular body rigidly associated with a bulkhead of the machine, and a second tubular body placed coaxially over the first tubular body and rotatable relative to the first tubular body about a common axis of rotation, the device further comprising electric drive means incorporated into the at least one roller, having at least one inductor member associated rigidly with one of said first tubular body and said second tubular body and at least one inducible member associated rigidly with the other of the respective first tubular body and the second tubular body.

2. A device as in claim 1, wherein the inductor member comprises an annular stator occupying a respective first annular seating fashioned concentrically on the first tubular body, and the inducible member comprises an annular rotor coaxial with the stator and occupying a respective second annular seating fashioned concentrically on the second tubular body.

3. A device as in claim 2, wherein the inductor member and the inducible member are aligned on a common median plane transverse to the common axis of rotation, and disposed respectively with an outer peripheral annular face and an inner peripheral annular face breasted together and separated by an air gap.

4. A device as in claim 1, wherein the inductor member and inducible member coincide respectively with a primary winding and a secondary winding of a linear electric motor.

5. A device as in claim 1, wherein the inductor member comprises electric windings disposed in relative slots of the inductor member.

6. A device as in claim 1, wherein the inducible member is embodied in a conductive homogeneous metallic material.

7. A device as in claim 1, wherein each roller comprises at least one fixed measuring transducer element positioned to interact with the second tubular body when set in rotation about the common axis relative to the fixed first tubular body.

8. A device as in claim 7, wherein the function of the measuring transducer element at any given moment in operation is to determine dynamic parameters governing an angular displacement of the second tubular body about the common axis of rotation and its position relative to the fixed first tubular body, and to generate an output signal indicating the dynamic parameters monitored.

9. A device as in claim 1, wherein the first tubular body affords an internal longitudinal cavity and a lateral opening, both connected to a first duct conveying a negatively pressurized gas and connected in turn to a source of negative pressure, and the second tubular body affords a plurality of peripheral flutes each proportioned to accommodate a respective stick tobacco product and furnished with through holes fashioned radially in the second tubular body, by which the flute is connected to the lateral opening of the first tubular body in such a way that the stick tobacco product can be retained by suction.

10. A device as in claim 9, wherein each roller further comprises a third tubular body, interposed concentrically between the first and second tubular bodies and keyed rigidly onto the first tubular body, which presents a respective lateral opening coinciding with the lateral opening of the first tubular body, also a manifold connected to a second duct conveying pressurized gas and connected in turn to a source of pressurized gas, and furnished with a plurality of radial through holes positioned so as to coincide coaxially and cyclically during the rotation of the second tubular body about the common axis with the through holes afforded by the second tubular body.

* * * * *